(12) United States Patent
Bruso et al.

(10) Patent No.: US 7,421,446 B1
(45) Date of Patent: Sep. 2, 2008

(54) ALLOCATION OF STORAGE FOR A DATABASE

(75) Inventors: Kelsey L. Bruso, Minneapolis, MN (US); James M. Plasek, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 619 days.

(21) Appl. No.: 10/925,531

(22) Filed: Aug. 25, 2004

(51) Int. Cl.
*G06F 17/30* (2006.01)

(52) U.S. Cl. .................. 707/102; 711/100; 711/168; 707/3

(58) Field of Classification Search ............... 707/102, 707/3; 711/100, 168
See application file for complete search history.

(56) References Cited

U.S. PATENT DOCUMENTS

| | | | | |
|---|---|---|---|---|
| 5,649,214 A | * | 7/1997 | Bruso et al. | 704/8 |
| 5,675,790 A | * | 10/1997 | Walls | 707/205 |
| 5,960,446 A | * | 9/1999 | Schmuck et al. | 707/205 |
| 5,966,143 A | * | 10/1999 | Breternitz, Jr. | 345/629 |
| 6,026,401 A | * | 2/2000 | Brealey et al. | 707/8 |
| 6,334,175 B1 | * | 12/2001 | Chih | 711/170 |
| 6,615,219 B1 | * | 9/2003 | Bruso et al. | 707/102 |
| 2002/0099906 A1 | * | 7/2002 | Chan et al. | 711/111 |
| 2003/0061262 A1 | * | 3/2003 | Hahn et al. | 709/104 |
| 2003/0065656 A1 | * | 4/2003 | de la Torre et al. | 707/3 |
| 2004/0225659 A1 | * | 11/2004 | O'Brien et al. | 707/9 |
| 2005/0066095 A1 | * | 3/2005 | Mullick et al. | 710/200 |

* cited by examiner

*Primary Examiner*—Tim Vo
*Assistant Examiner*—Mahesh H Dwivedi
(74) *Attorney, Agent, or Firm*—Charles A. Johnson; Robert Marley; Crawford Maunu PLLC

(57) ABSTRACT

Various approaches for allocating storage for a file are disclosed. In one approach, in response to each call to allocate an available portion of storage, one of a plurality of allocation approaches is selected based on a value of a file attribute associated with the file. If a first one of the allocation approaches is selected, a portion of storage is selected for storage of data using an approach that emphasizes storage of data in sequential physical storage. If a second one of the allocation approaches is selected, a portion of storage using an approach that emphasizes maintaining concurrent access to the file.

15 Claims, 8 Drawing Sheets

ALLOCATION OF STORAGE FOR A DATABASE

FIELD OF THE INVENTION

The present disclosure relates to allocating storage space for a database.

BACKGROUND OF THE INVENTION

A database is often structured to satisfy application requirements of providing a desired level of concurrent access and controlling the amount of storage space used by the database. For concurrent access requirements, database designers and administrators may struggle to balance the needs of providing concurrent access to the database to as many users as possible while assuring that each user receives some equitable amount of access. In allocating storage space, a desire to minimize the amount of storage used by a database may oppose the desire to maximize concurrent access by spreading the database uniformly across physical file space.

Some approaches to managing storage space choose to either sequentially allocate physical storage space in order to reduce the amount of storage space used for data, or randomly allocate portions of physical storage space in order to increase concurrency. These approaches may be most suitable in applications where one objective may be readily sacrificed in order to achieve the other objective. For example, if concurrent access is not required, then an approach may be taken to allocate sequential physical storage space without regard concurrency considerations. There are, however, applications in which both concurrency and sequential storage are important objectives.

For example, during a data gathering phase a database application may need a very high level of concurrency to log transaction related data. Then, during an analysis phase the database may be used more for reading, and the need to conserve physical storage space may exceed the need for currency.

Current approaches may force the application designer to choose, at the time the database is created, either to maximize concurrency or to minimize use of storage space. Updates to the database are then made using an approach suitable for the designer-specified objective. Even though the needs for levels of concurrency versus amount storage space may change over time, updates to the database continue to be made using the approach specified by the user when the database was established.

SUMMARY OF THE INVENTION

The invention provides various embodiments for allocating storage for a file. In one approach, in response to each call to allocate an available portion of storage, one of a plurality of allocation approaches is selected based on a value of a file attribute associated with the file. If a first one of the allocation approaches is selected, a portion of storage is selected for storage of data using an approach that emphasizes storage of data in sequential physical storage. If a second one of the allocation approaches is selected, a portion of storage using an approach that emphasizes maintaining concurrent access to the file.

In another embodiment, an apparatus is provided for allocating storage for a file. The apparatus includes means, responsive to each call to allocate an available portion of storage, for selecting one of a plurality of allocation approaches based on a value of a file attribute associated with the file. Another means, responsive to selection of a first one of the allocation approaches, selects a portion of storage for storage of data using an approach that emphasizes storage of data in sequential physical storage. Still another means, responsive to selection of a second one of the allocation approaches, selects a portion of storage using an approach that emphasizes maintaining concurrent access to the file.

In another embodiment, a system is provided for allocating storage for a file. A quantity of retentive storage is reserved for allocation to a database file, and a file attribute is associated with the database file. The value of the file attribute indicates one of a plurality of allocation approaches to be used for allocating storage from the reserved storage to the file. A plurality of allocation records are associated with respective portions of the reserved quantity of storage. A database management system (DBMS) is coupled to the quantity of retentive storage and to the allocation records. The DBMS is configured to select, in response to each call to allocate an available portion of reserved storage, one of the plurality of allocation approaches based on the a value of the file attribute. In response to selection of a first one of the allocation approaches, the DBMS selects a portion of reserved storage based on attempting to store the data in sequential physical storage. In response to selection of a second one of the allocation approaches, the DBMS selects for storage of data a portion of reserved storage based on attempting to maintain concurrent access to the database file.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

The various embodiments of the invention provide selectable storage allocation approaches that may be used to promote a desired level of concurrency or promote sequential allocation of physical storage space. One or more attributes may be associated with the files of a database and the values of the attributes used to control whether concurrency or sequential storage is promoted when storage is allocated for the database. In addition, each program that accesses the files of the database may be allowed to select, when storage is to be allocated to the database in response to a request by a program, whether sequential storage allocation or concurrency will be emphasized.

Figures 1, 2:
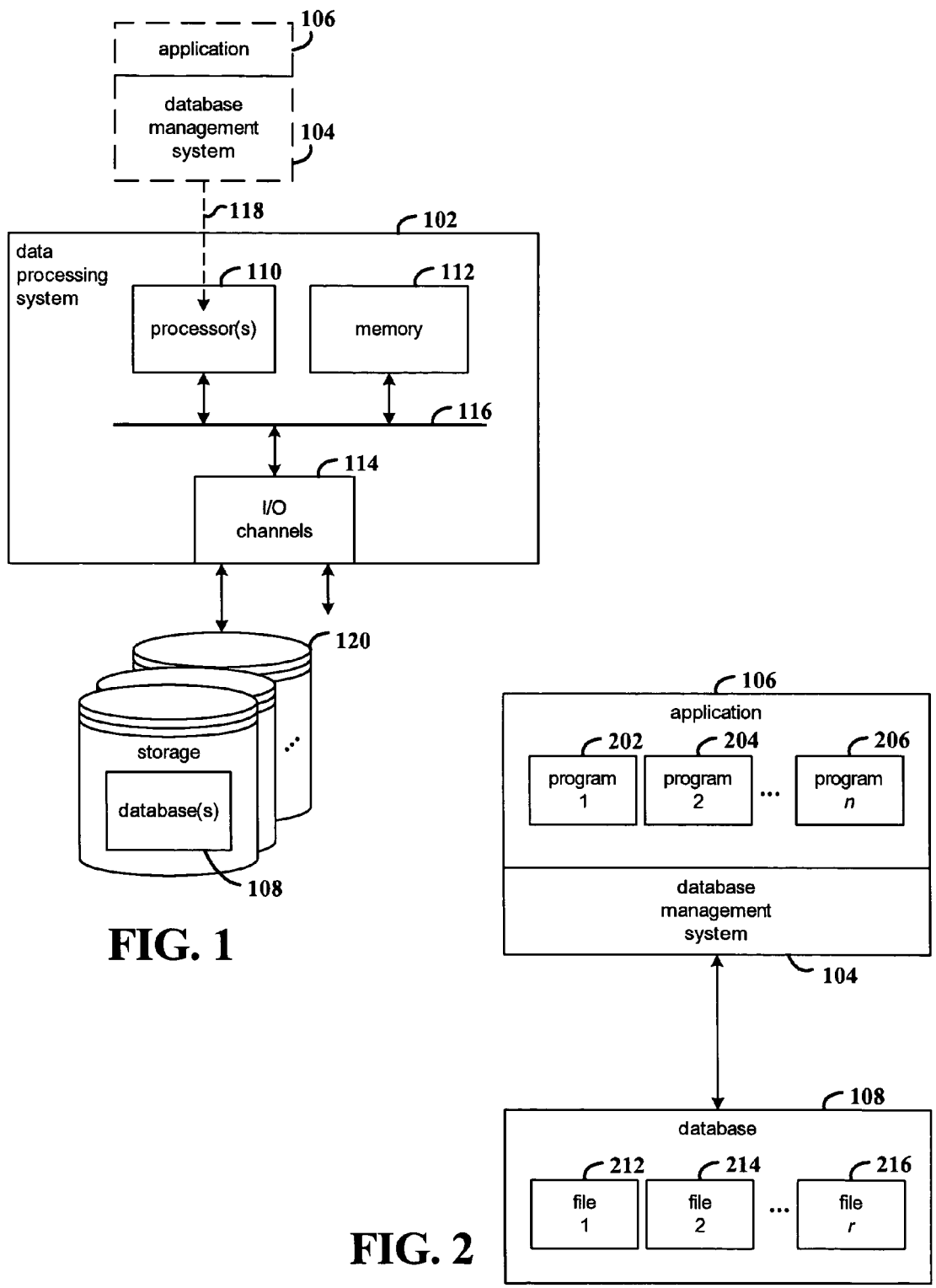
FIG. 1 is a block diagram of an example data processing system in which various embodiments of the present invention may be implemented.
FIG. 2 is a block diagram that illustrates an application coupled to a database.

FIG. 1 is a block diagram of an example data processing system 102 in which various embodiments of the present invention may be implemented. The data processing system hosts a database management system (DBMS) 104 and an application 106 that uses the DBMS to manage and control access to one or more databases 108.

The hardware of the data processing system that hosts the DMBS and application software includes one or more processors 110, a memory subsystem 112, and one or more input/output (I/O) channels 114. The various hardware is coupled via bus 116. The processor(s) 110 execute the DBMS and application (dashed line 118), and access to the database (s) in storage 120 is provided to the application by way of the bus and I/O channel. Storage 120 may be any implementation-suitable type of retentive store, such as an array of magnetic disks or network storage.

It will be appreciated that various alternative hardware components and system architectures may be suitable to host the DBMS and application depending on implementation requirements. In addition, many different types of DBMSs may be suitable for adaptation to implement various features of the different embodiments of the present invention. One example of the many different data processing systems suitable for the embodiments of the present invention is the ClearPath data processing system from Unisys Corporation, and an example DBMS is the RDMS system also from Unisys.

FIG. 2 is a block diagram that illustrates an application 106 coupled to a database 108. Concurrency and storage management issues may arise in environments in which multiple programs are writing data to a database. An application may include one or more programs 202, 204, and 206, and a database may include one or more files 212, 214, and 216. The programs may perform any of a variety of functions on database 108 depending on implementation requirements. Generally, the functions may simply involve reading data from, writing data to, or updating existing data in the database. One or more of the files may contain the actual data provided by a user as inputs or received by a user as output. Depending on the particular DBMS, others of the files may contain structural data, for example, indices, that is used in providing storage for and access to the actual data, and still others of the files may contain meta data of the database.

One operation in which concurrency issues may arise is with write operations. Write operations add data to a database, and depending on application requirements, one or more of programs 202, 204, and 206 may issue concurrent write requests. To preserve the integrity of the database, when data is being written to the database no other operations may be performed in the portion of the database to which the data is being written. That portion of the database in which a write is being performed and to which no other program is allowed access is said to be locked. Locking a portion of a database eliminates concurrency in that part of the database for the duration of the lock. If a write operation requires additional storage for structural data such as indices, the locked portion of the database may be quite large and thereby substantially limit concurrent access.

Various embodiments of the invention use respective attribute values for the files 212, 214, and 216 in the database 108 to control selection of the approach taken to allocate storage for the database when additional storage space is needed. The attribute values are associated with individual files of the database rather than being applicable to the database as a whole. This permits allocation control over individual files rather than over the entire database.

The approaches generally involve allocating physical storage with an emphasis on allocating sequential physical storage toward the beginning of the file, or allocating physical storage with an emphasis on maintaining a high-level of concurrency. Further controls allow programs to change and intermix these approaches depending on application requirements. For example, the attribute value for a file may be changed by a program with sufficient privileges or a program may select to override the approach that would be selected by the attribute value.

Figure 3A:
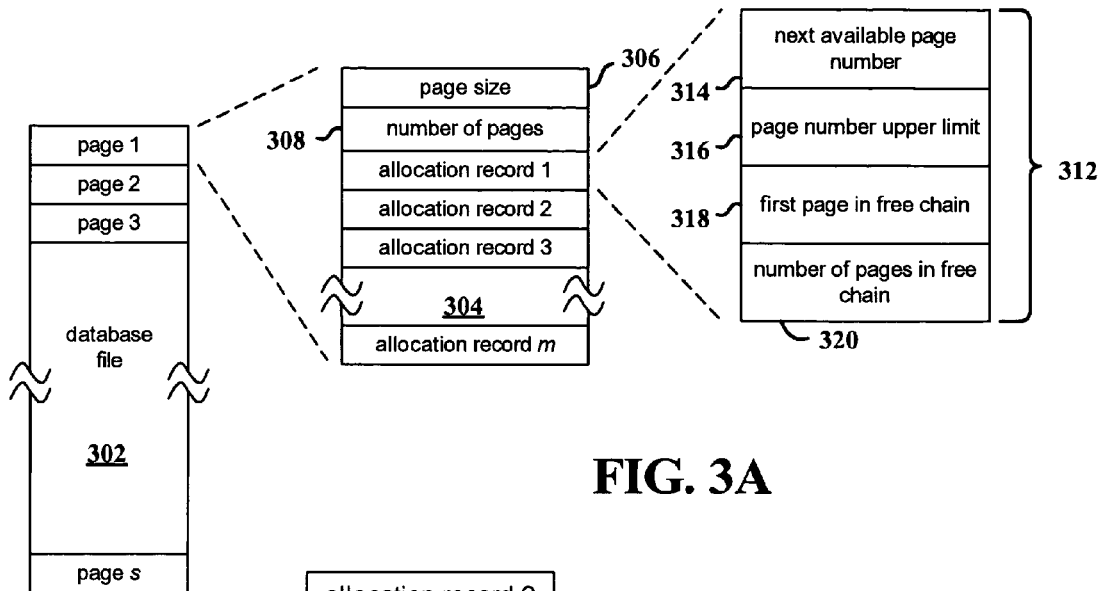
FIGS. 3A-3F illustrate example data structures used in accordance with various embodiments of the invention.

FIG. 3A illustrates example data structures used in accordance with various embodiments of the invention. Allocation and management of physical storage space to a database is often performed using a fixed-size unit of storage. Some systems refer to this fixed unit of storage as a page. The size of a page may vary according to the system architecture. A file such as database file 302 may be represented as a collection of pages, for example pages 1-s.

In some systems, before a database is populated with data, a set of pages is reserved for allocation to storage of data. A page that is not used for storage of database data is said to be available. Once a page is used for storage of data, the page is said to be allocated. The process of selecting an available page for storage of data is referred to as allocation. Pages 1-s represent the set of pages reserved for database file 302.

In some systems the set of reserved pages may occupy sequential physical storage. Thus, the physical storage address that begins page 2 immediately follows the last address of page 1, the storage address that begins page 3 immediately follows the last address of page 2, etc. The sequential storage supports fast committing of data from memory 112 to retentive storage 120 when updates are made by an application.

In one embodiment, the DBMS uses page 1 of the database file to manage those pages that are available for allocation. Page 1 includes the information shown in block 304, which includes the size of pages in the database file, the total number of pages in the database file, and m allocation records. The page size 306 and number of allocation records (m) may be set according to application or system requirements. The number of pages 308 is computed from the size (e.g., words or bytes) of the database file divided by the page size.

The page size is chosen by the DBA based on application and environmental factors. All DBMS's support only a restricted number of page sizes. For example, RDMS supports page sizes of 112, 224, 448, 896, 1792, 3584, and 7168 words. The page must be large enough to contain at least one record. When a table is very small, and each transaction must update one of the table's records, it is advantageous to place only one record per page. The larger the page size, the more time it takes to read the page from retentive storage and write the page back to storage. A larger page is therefore a disadvantage when the application wants to read only a single record on the page. A larger page is an advantage when the application reads multiple sequential records (reading a single page will involve a larger number of records). In addition to the above criteria, disks, and cache memory have a blocking factor, and it is advantageous to use sizes that match these blocking factors.

Determining a suitable number of allocation records may involve a number of factors. One factor is the number of transactions for which concurrent use of allocation records is to be provided (only one transaction is allowed to access an allocation record at a given time, but each transaction needs access to only one of the allocation records at that time). This provides an upper bound on the number of allocation records (e.g., if the number of transactions needing concurrent access is 5, nothing is to be gained by having more than 5 allocation records). There may be an additional cost in having allocation records beyond the needed number of concurrent transactions. For example, if a linear search is done to select an allocation record, the cost increases as the number of allocation records increases. If the number of allocation records is too large, relative to the number of pages in the file, some of the allocation records may be depleted of available pages too fast. A consequence is that a transaction seeking to allocate a page from an empty allocation record would borrow pages from another allocation record and thereby lock both allocation records.

Each of the allocation records includes specific information used in managing a subset of the available pages in the database file. In one embodiment, each allocation record may be associated with a range of pages. Block 312 illustrates the information in an allocation record. The next available page number 314 indicates the first page number in the range that is available for allocation. The page number upper limit 316 indicates the last page number in the range. The first page associated with an allocation record is not tracked, only the upper limit of page numbers and the next available page.

The allocation records may also be used to manage a chain of free pages. A free page is a page that is available for allocation but has already been allocated and then deallocated. For example, an application may need a page for temporary storage of data during the course of processing. Once the application no longer needs the page, the page may be returned for available storage for subsequent allocation if needed.

A chain of free pages is maintained in an allocation record separate from the other available pages under control of the allocation record. This allows free pages to be given preference for allocation over other available pages. The first page in free chain 318 is the page number of the first free page, and the number of pages in free chain 320 indicates the total number of pages in the free chain. The chain may be linked by storing in each page the page number of the next page in the chain.

Allocating an available page that has already been used (free page) over a page that has never been used may be desirable to promote efficient I/O by the DBMS. This is because a page in the free chain is often preceded and succeeded in the file by pages containing data (allocated pages). A page in the free chain can thus be thought of as being a "hole" in the sequence of file pages. When the DBMS performs an I/O operation to read a sequence of pages to scan in support of a user query, the DBMS may read not only allocated pages with data but also some free pages. It is more efficient for the DBMS if the sequential pages all have data. Thus, it is advantageous to allocate free pages before allocating pages that have never been used.

The various embodiments of the present invention provide two general approaches for allocating storage to a database file. One approach emphasizes minimizing the amount of storage occupied by the database files and attempts to allocate sequential physical storage without entirely compromising concurrent access. The other approach emphasizes concurrent access to the database files by attempting to evenly distribute allocation of pages across all the pages reserved for the database file.

Available pages are distributed in different proportions amongst the allocation records as between the two example allocation approaches. An example initial distribution of available pages for approach that attempts to minimize the amount of storage allocated to a database file is (assuming the use of 8 allocation records):

allocation record 1: 6% of available pages
allocation record 2: 7% of available pages
allocation record 3: 8% of available pages
allocation record 4: 9% of available pages
allocation record 5: 10% of available pages
allocation record 6: 11% of available pages
allocation record 7: 12% of available pages
allocation record 8: 37% of available pages An example initial distribution of pages for the approach that promote concurrency is:

allocation record 1: 12.5% of available pages
allocation record 2: 12.5% of available pages
allocation record 3: 12.5% of available pages
allocation record 4: 12.5% of available pages
allocation record 5: 12.5% of available pages
allocation record 6: 12.5% of available pages
allocation record 7: 12.5% of available pages
allocation record 8: 12.5% of available pages The allocation approaches assume that the range of pages associated with an allocation record sequentially follow the range of pages of the preceding allocation record.

It will be recognized that with the approach that attempts to minimize the amount of storage, the chosen initial distribution may vary according to application requirements. In selecting a page for allocation with this approach, the process first attempts to allocate a page associated with allocation record 1. If allocation record 1 is locked, the process moves to the next allocation record (allocation record 2). Sequential allocation of pages is promoted by beginning with the first allocation record, and a level of concurrency is preserved with the distribution of pages across the allocation records. The allocation approach that promotes concurrency attempts to evenly distribute use of the allocation records for concurrent allocation requests.

Figure 3B:
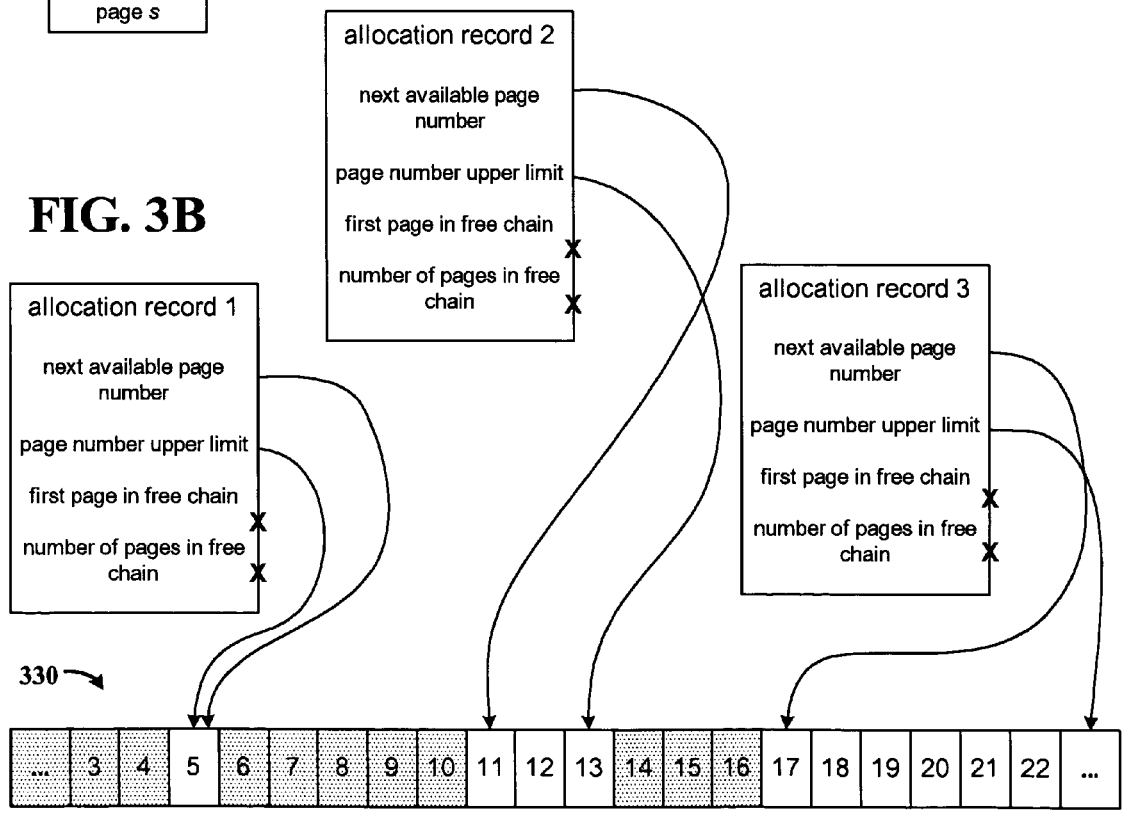

FIGS. 3B-3F illustrate a scenario in which pages of a file are allocated using the approach that attempts to minimize storage. In FIG. 3B, pages 1-4 and 6-10, and 14-16, in the file 330 are used (filled with data records). To arrive at this state, multiple inserting or updating transactions executed simultaneously, each requesting a new page. Each program first tried allocation record 1, then allocation record 2, then allocation record 3. By attempting to allocate from the allocation records in this order, the pages toward the beginning of the file are filled and those toward the end remain available. The dissimilar sizes for the amount of space controlled by each allocation record reinforces the goal of minimizing storage space. When multiple programs are trying to insert or update the data base simultaneously, collisions inevitably occur in trying to access the allocation records, which is why multiple allocation records are implemented and the sequencing from 1 to 2 and so on. In the example file 330, pages 5, 11-13, and 17-22 have never been used. Pages that follow page 22 are also assumed to have never been used.

If it is assumed that the final population of the database file is that of FIG. 3B, any unused pages in the file may be wasted space. The unused space in the file, in some file systems, is part of the space assigned on a disk by the file system to the database file and cannot be used by any other file. This unused space is effectively lost space on the disk until the file is deleted.

Having fewer pages in the first allocation record—which is always searched first for available pages—results in the all of pages of the first allocation record being allocated first. Once all the pages of an allocation record have been allocated, pages from another allocation record are re-associated with the empty allocation record in order to have pages available for allocation in the allocation record when a subsequent attempt is made to allocate from that record.

Figure 3C:
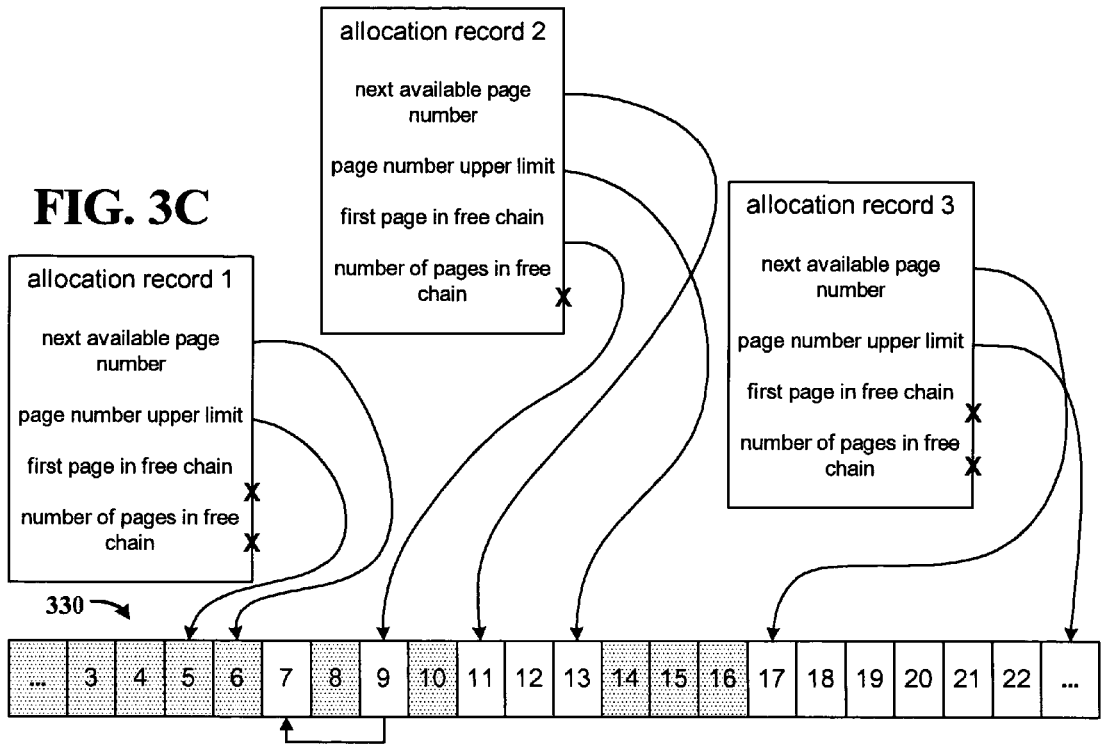

FIG. 3C illustrates the state of file 330 after page 5 has been allocated. Allocation record 1 then has no available pages. Note that the next available page number in allocation record 1 is greater than the page number upper limit, which means that allocation record 1 has no available pages. When an attempt is made to allocate a page from an allocation record with no available pages, pages from another allocation record are re-associated with the empty allocation record. The state of file 330 in FIG. 3C also illustrates that pages 7 and 9 are no longer needed for storage of data and have been returned to allocation record 2 and made part of the free chain.

Figure 3D:
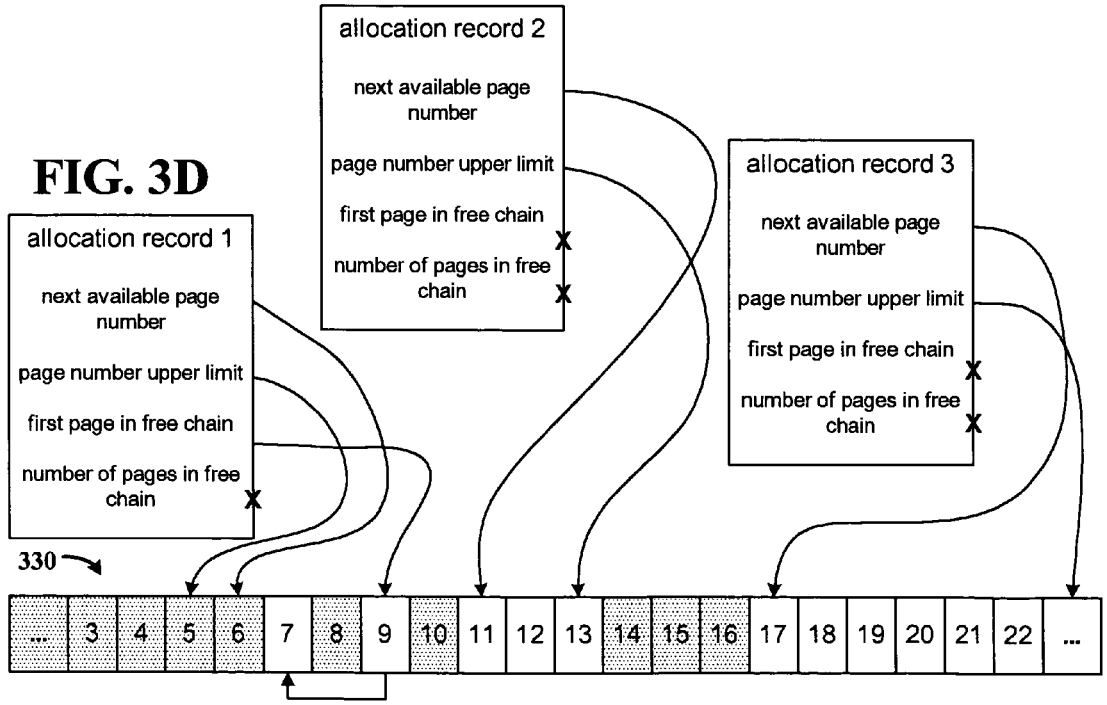

FIG. 3D illustrates the state of file 330 after pages from allocation record 2 have been re-associated with allocation record 1. In re-associating pages, pages on the free chain are selected first. Thus, the free chain of allocation record 2 has been made the free chain of allocation record 1.

Figure 3E:
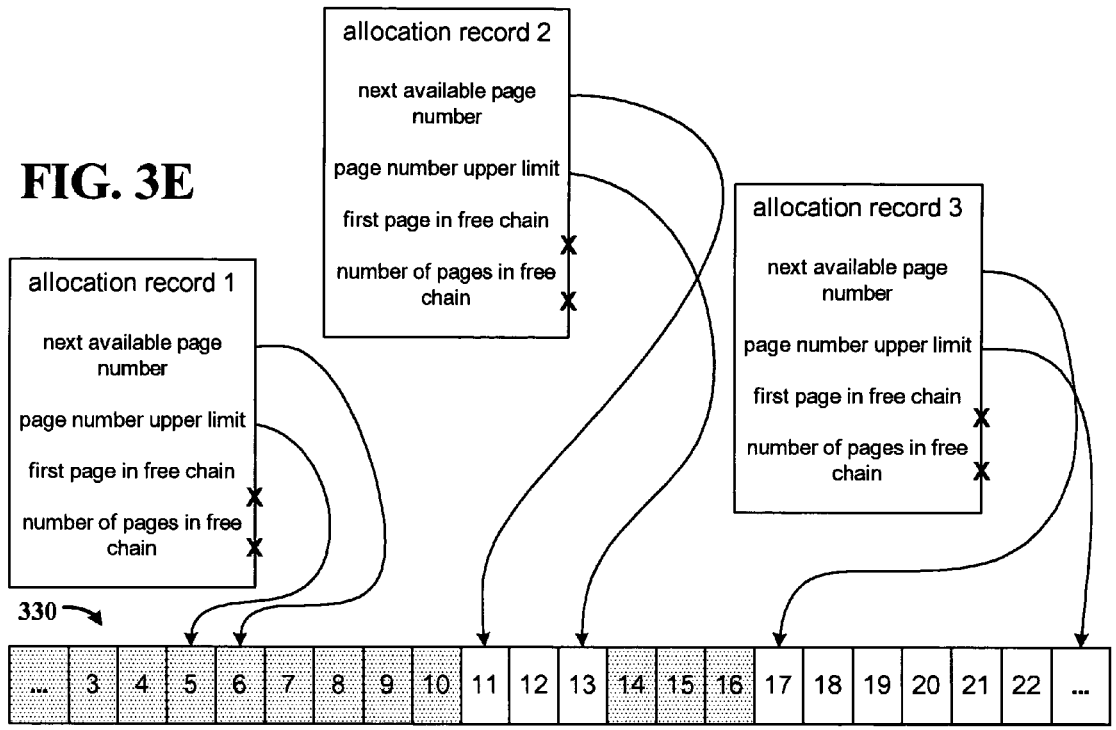
Figure 3F:
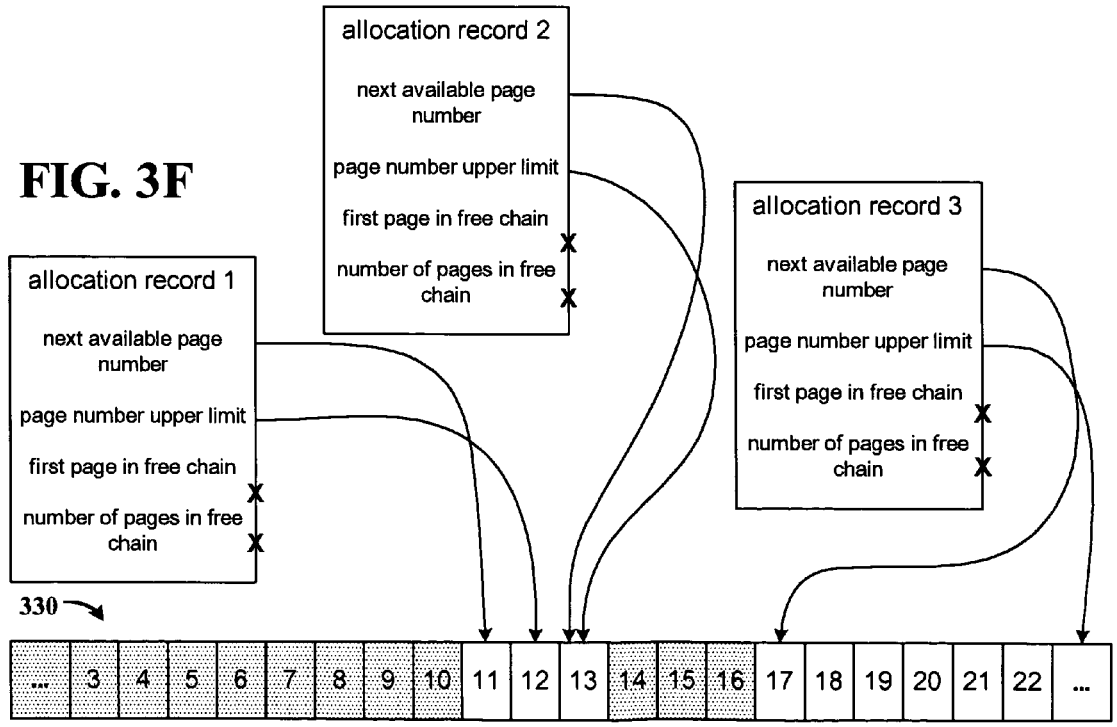

The example continues with FIG. 3E in which pages 7 and 9 have been allocated and filled with data, leaving allocation record 1 empty again. At the next attempt to allocate pages from allocation record 1, Because allocation record 2 has no more pages on its free chain, some of the never used pages from allocation record 2 are re-associated with allocation record 1. FIG. 3F illustrates the state of file 330 after some of the never used pages from allocation record 2 have been re-associated with allocation record 1.

In an example embodiment, once pages have been moved from one allocation record to another, the pages are not returned to the source allocation record. Thus the range of pages covered by an allocation record may increase over time. Also, over time the allocated pages at the front of the file will be packed (i.e., no interspersed unallocated pages). The approach that seeks to minimize storage space, in contrast to the approach that seeks to maximize concurrency, requires moving pages between allocation records sooner and more frequently because only some pages are moved in an effort to keep the data tightly packed at the beginning of the file.

Figure 4:
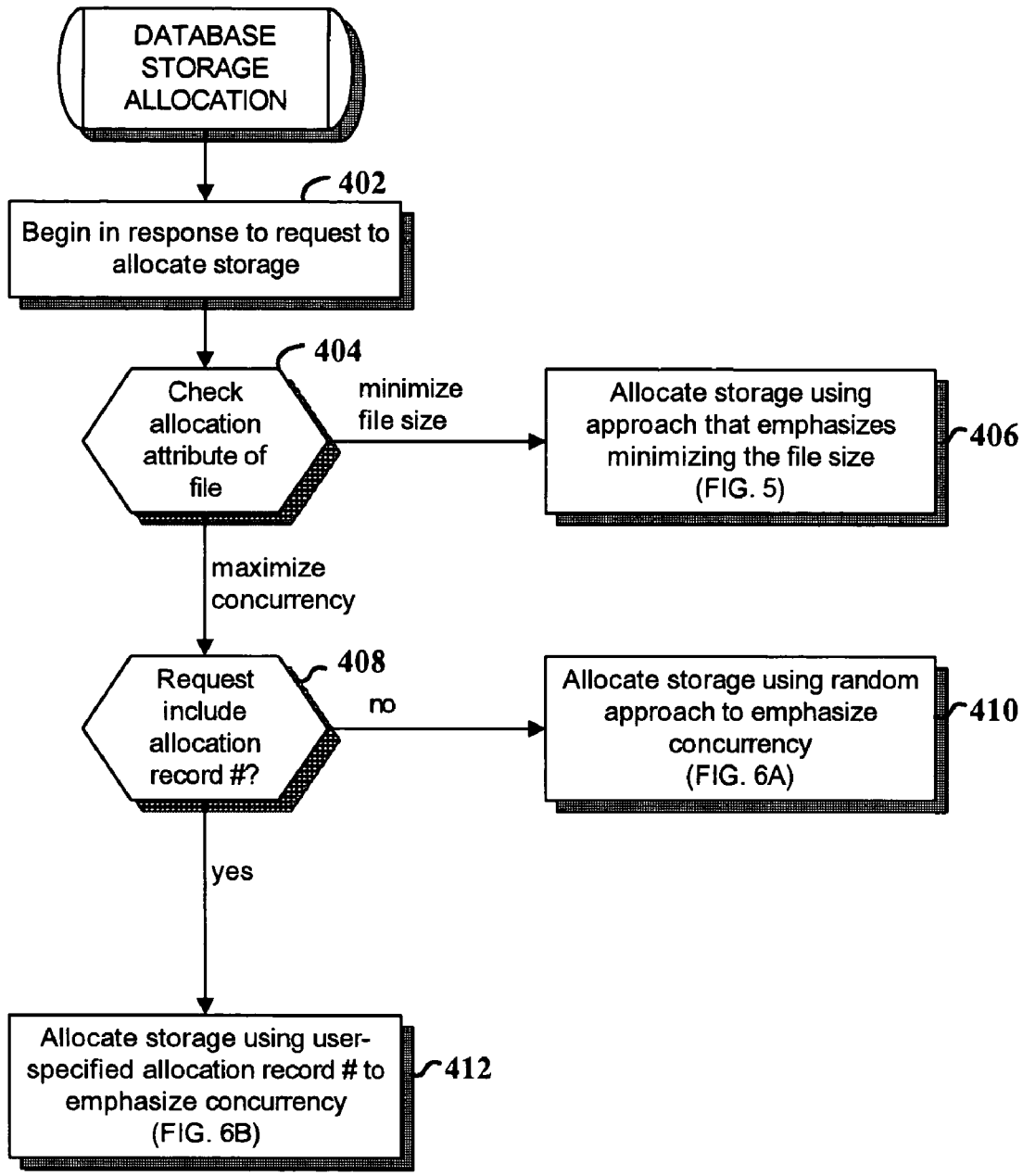
FIG. 4 is a flowchart of an example process for allocating storage to a database file in accordance with various embodiments of the invention.

FIG. 4 is a flowchart of an example process for allocating storage to a database file in accordance with various embodiments of the invention. A file attribute may be used to control, in allocating storage, whether minimizing storage space or promoting concurrency is emphasized. The value of the attribute may be controlled by a database administrator or set at run-time by an application. This allows the approach to be modified according to application requirements. The process generally uses the value of a file attribute to select a specific approach to allocate storage.

The process begins in response to a request to allocate storage (step 402). A request to allocate storage may be made by the DBMS in response to an application seeking to write additional data to a database file. The DBMS may allocate a page in one of two general cases. The first case is when the first record is to be written to a page in the database. The second case is when a data page is full and the page must be split in order to accommodate storage of additional records. Page splitting generally involves allocating an additional page and splitting the data stored on the original page between the original page and the additional page.

Figure 5:
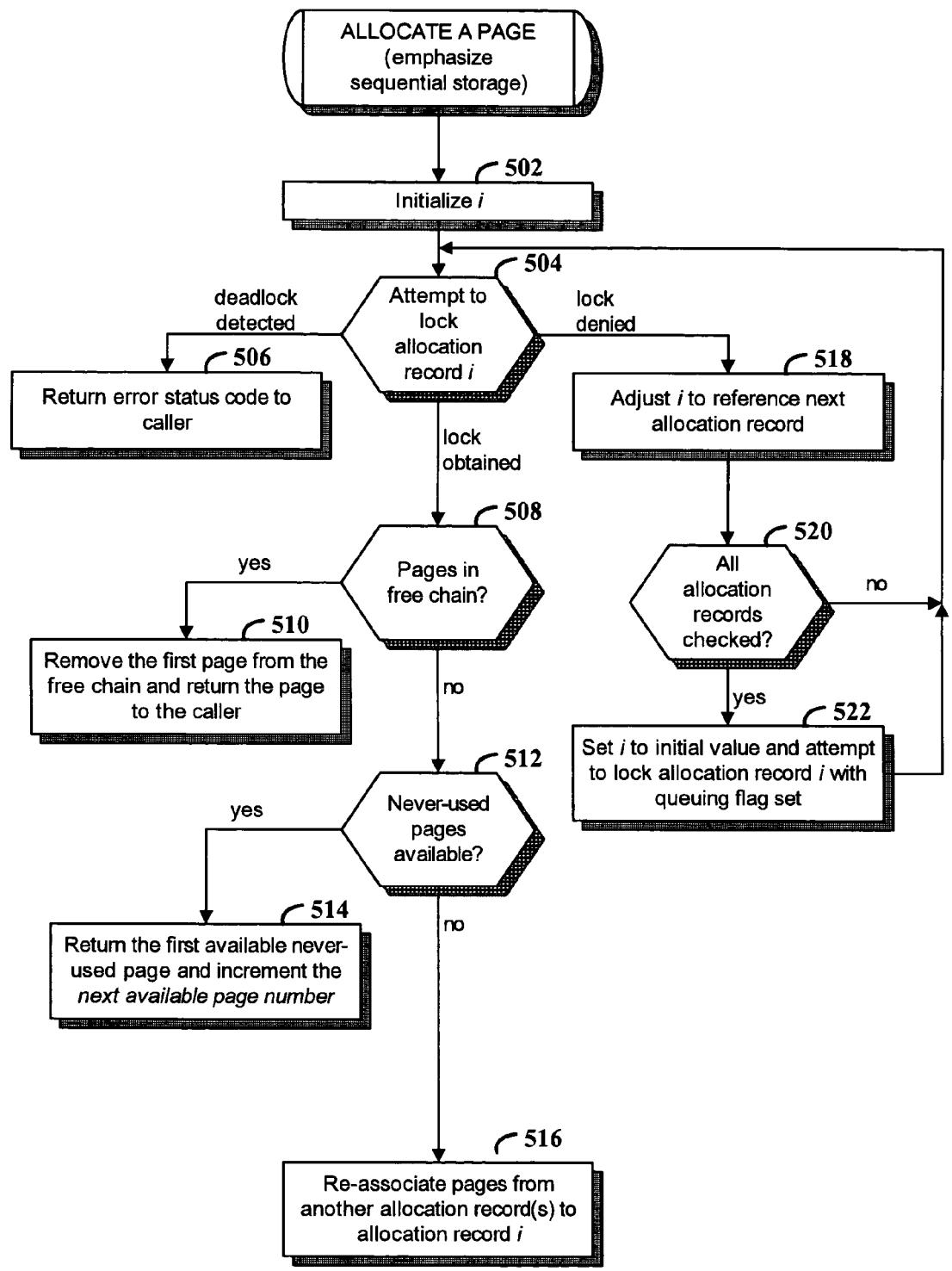
FIG. 5 is a flow chart of an example process for allocating a page of storage with an emphasis on allocating sequential physical storage for storage of database data.

The process checks the value of the file attribute at step 404, and if the value of the attribute indicates that the allocation of storage should emphasize minimizing the file size, storage is allocated (step 406) using the approach of FIG. 5.

Figure 6A:
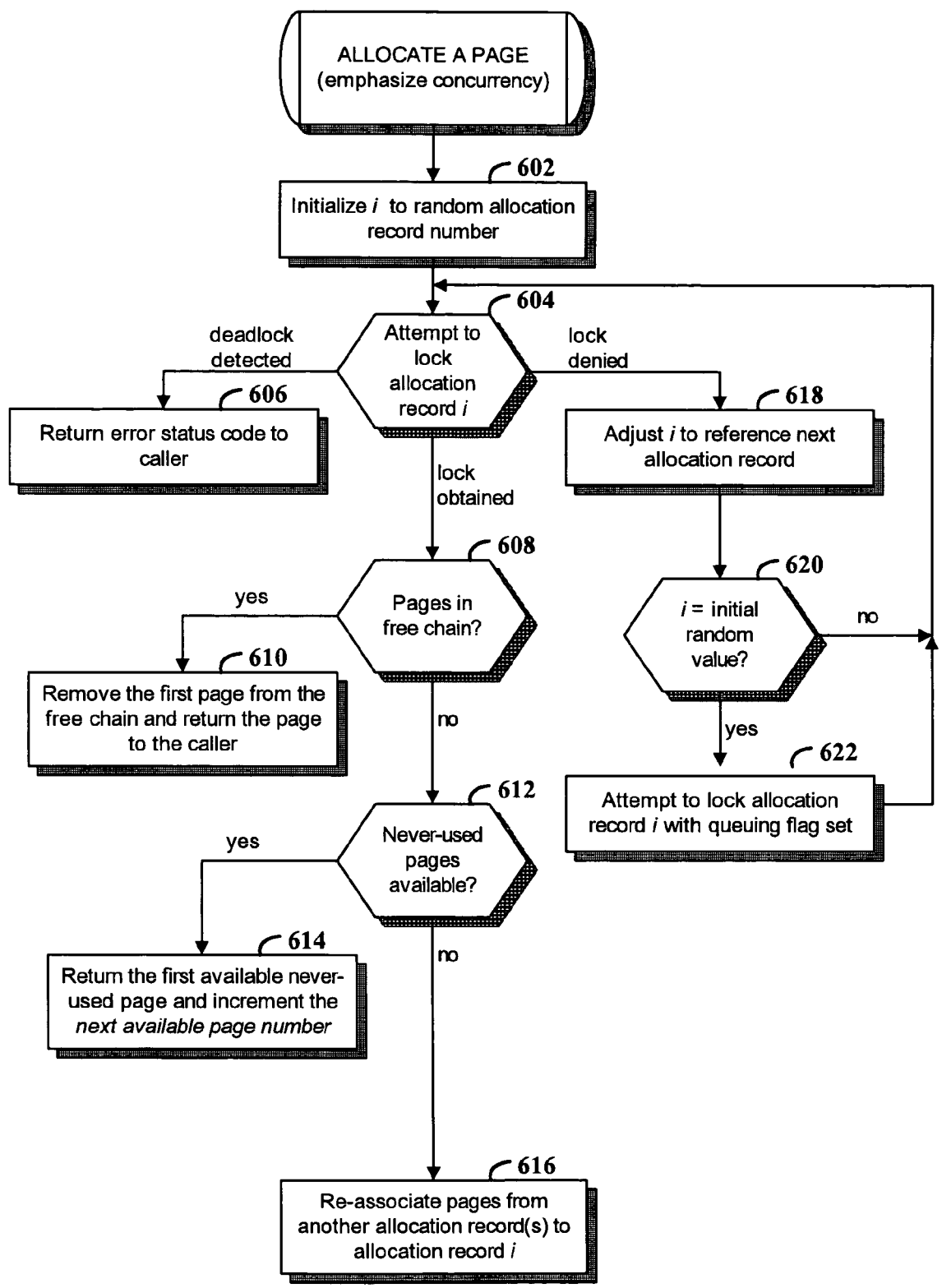
FIG. 6A is a flow chart of a first example process for allocating a page of storage with an emphasis on supporting concurrent access to the database.
Figure 6B:
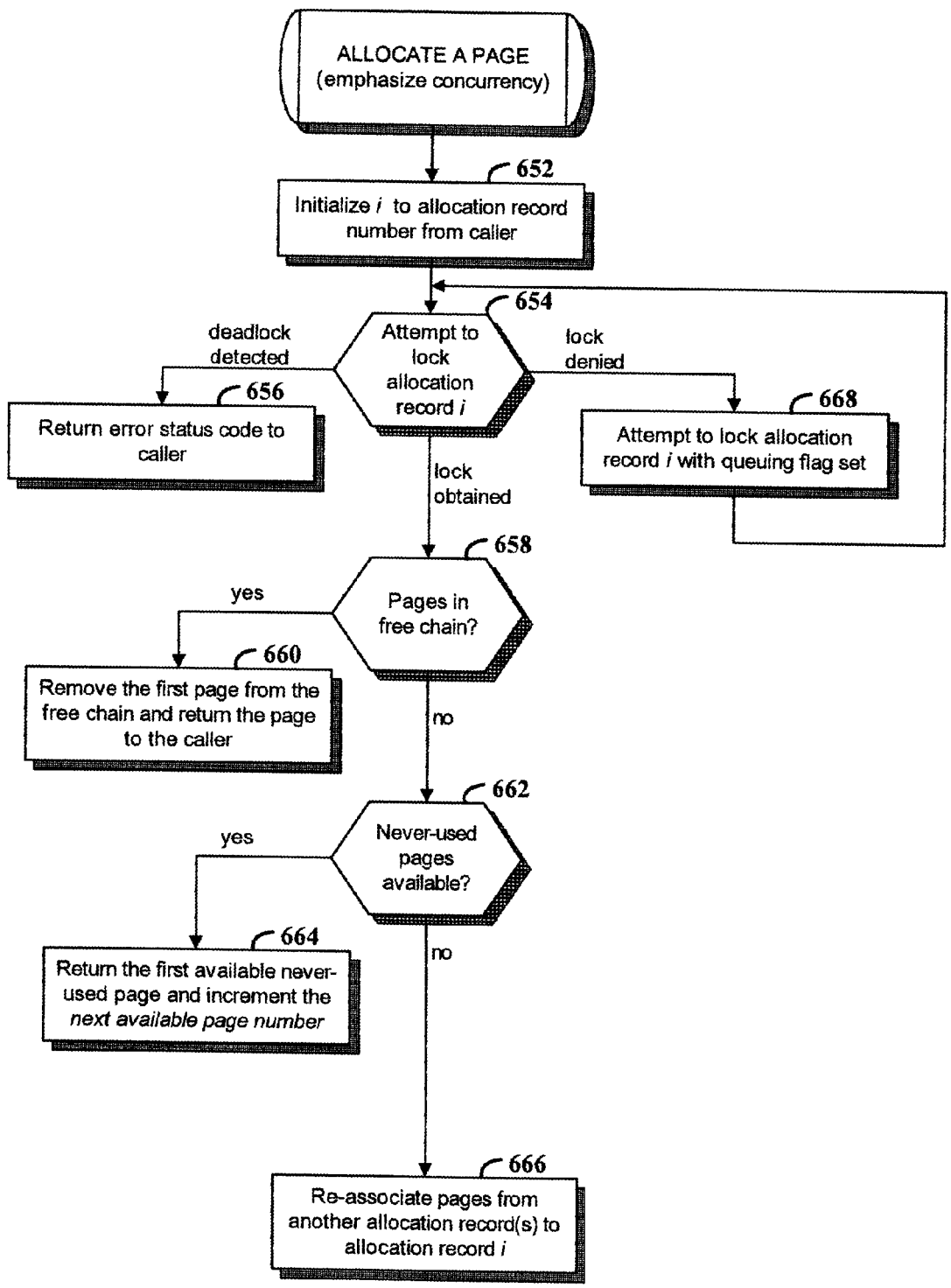
FIG. 6B is a flow chart of a second example process for allocating a page of storage with an emphasis on supporting concurrent access to the database.

Otherwise, if the value of the attribute indicates that the allocation of storage should emphasize concurrency, the process checks (step 408) whether an allocation record number is specified in the request (or function call). The requester may specify a particular allocation record to exercise a further level of control over the available concurrency. If no allocation record number is specified, the process of FIG. 6A is performed (step 410). The process of FIG. 6B is performed in response to the an allocation record number being specified (step 412).

FIG. 5 is a flow chart of an example process for allocating a page of storage with an emphasis on allocating sequential physical storage for storage of database data. To emphasize allocation of sequential physical storage, the process is configured to begin attempts to allocate a page with the first allocation record; i is initialized to 1 at step 502.

The process attempts to lock allocation record i (step 504), and if the lock attempt results in a deadlock, an error status code is returned (step 506). If a lock is obtained, the process proceeds to check for a page in the free chain of allocation record i (step 508). If there is an available free page, the first page is removed from the free chain and returned (step 510). If there are no pages in the free chain, the process checks whether the allocation record has any never-used pages available (step 512). If the next available page number is less than or equal to the page number upper limit, then there are pages available and the first available page is returned (step 514). Along with returning the first available page, the next available page number is incremented.

If there are not any never-used pages available, the process re-associates pages between the allocation records (step 516). The re-association of pages results in allocation record i having some number of pages for available for allocation. In one embodiment, the process of moving allocation records seeks to move available pages from the next successive allocation record in order to promote sequential storage of data and thereby attempt to minimize use of storage space.

If in the attempt to lock allocation record i (step 504), the lock is denied, i is adjusted to reference the next allocation record (step 518). In the example embodiment, this involves incrementing i. It will be appreciated, however that different associations of page ranges with the allocation records may result in some adjustment other than incrementing i. For example, if the associated ranges of pages begin with the lowest number pages associated with allocation record 8 and end with the highest number pages being associated with allocation record 1, then i would be decremented. The ranges of pages associated with the allocation records and the incrementing of the allocation record number places the emphasis on allocating storage from the beginning of the file.

The process returns to step 504 to attempt to lock the newly referenced allocation record i if lock attempts have not been made on all the allocation records (step 520). If lock attempts have been made on all the allocation records and the requests denied, i is reset to the initial value, and a flag is set to cause the process to be queued on the lock request if a lock cannot be granted on the next attempt (step 522). The process returns from step 522 to step 404 to attempt to lock allocation record i.

FIG. 6A is a flow chart of a first example process for allocating a page of storage with an emphasis on supporting concurrent access to the database. In one embodiment, the DBMS may control whether the approach of FIG. 6A or the approach of FIG. 6B is followed by not specifying or by specifying a particular allocation record number on which a lock is attempted. If no allocation record number is specified, then the approach of FIG. 6A is followed.

The process commences with initialization of the allocation record number to a randomly selected number between 1 and the number of allocation records (step 602). Any implementation-suitable pseudo-random number generator may be used. The allocation record number is referenced as i.

Steps 604, 606, 608, 610, 612, and 614 of the process of FIG. 6A correspond to steps 502, 504, 506, 508, 510, 512, and 514, respectively of FIG. 5, and the description of FIG. 5 may be referenced for explanation of those steps. Step 616 of FIG. 6A involves moving pages from one allocation record to an allocation record that has no available pages. The re-association of pages results in allocation record i having some number of pages available for allocation. In one embodiment, moving pages between allocation records under this approach seeks to maintain a balance of pages between the allocation records without unduly impacting concurrency in the process of moving pages.

If in the attempt to lock allocation record i (step 654), the lock is denied, i is adjusted to reference the next allocation record (step 618). In the example embodiment, this involves incrementing i. The even distribution of ranges of pages associated with the allocation records and the incrementing of the allocation record number based on an initial random value places the emphasis on allocating storage while maintaining concurrency.

The process returns to step 604 to attempt to lock the newly referenced allocation record i if lock attempts have not been made on all the allocation records (step 620). If lock attempts have been made on all the allocation records and the requests denied, a flag is set to cause the process to be queued on the lock request if a lock cannot be granted on the next attempt (step 622). The process returns from step 622 to step 604 to attempt to lock allocation record i.

FIG. 6B is a flow chart of a second example process for allocating a page of storage with an emphasis on supporting concurrent access to the database. The approach followed by the process of FIG. 6B uses a requester-specified allocation record number as the initial allocation record number i (step 652). Steps 654, 656, 658, 660, 662, 664, and 666 of FIG. 6 correspond to steps 604, 606, 608, 610, 612, 614, and 616 of FIG. 6A, and the description of FIG. 6A may be referenced for explanation of those steps.

If the lock is denied, the process sets a queuing flag and again attempts to lock allocation record i (step 668). If the lock cannot be granted, the process is queued to wait until the lock can be granted.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for allocating storage for a file, comprising:
reserving a quantity of sequential physical storage for the file;
selecting, in response to each call to allocate an available portion of the storage of the file, one of a plurality of allocation approaches based on a value of a file attribute associated with the file;
establishing a plurality of allocation records for the file and assigning initial respective portions of the reserved quantity of storage with the allocation records, wherein for the value of the file attribute specifying a first of the allocation approaches, the initial respective portions increase in quantity from a first of the allocation records to a last of the allocation records, and for the value of the file attribute specifying a second of the allocation approaches, the initial respective portions have equal quantities;
selecting for storage of data, in response to selection of the first allocation approach, a portion of storage of the file from one of the respective portions assigned to one of the allocation records, wherein the selecting under the first approach begins with the first allocation record and proceeds toward the last allocation record in seeking an available portion to allocate wherein physical storage is allocated based on maintaining sequentially allocated portions;
selecting for storage of data, in response to selection of the second allocation approach, a portion of storage of the file from one of the respective portions assigned to one of the allocation records, wherein the selecting under the second approach begins with an allocation record other than the first allocation record in seeking an available portion to allocate wherein physical storage is allocated based on maintaining concurrent access to the file; and
in response to an allocation record having no available portion of storage for the file, reassigning portions from one allocation record to another, wherein reassigning for the file attribute indicating the first approach reassigns portions from a next successive allocation record, and reassigning for the file attribute indicating the second approach balances respective portions assigned to the allocation records.

2. The method of claim 1, further comprising:
wherein the first one of the allocation approaches includes,
selecting as a current portion, a portion at the beginning of the reserved quantity of storage;
attempting to lock the current portion of the reserved quantity of storage;
allocating for storage of data, in response to a lock granted to the current portion, an amount of storage from the current portion;
selecting, in response to denial of the lock of the current portion, a new portion that sequentially follows the current portion, and repeating the steps of attempting, allocating, and selecting using the new portion as the current portion.

3. The method of claim 2, further comprising queuing for a lock on the portion at the beginning of the reserved quantity of storage in response to denial of locks for each other portion of the reserved quantity of storage.

4. The method of claim 1, further comprising:
wherein the second one of the allocation approaches includes,
selecting at random as a current portion, one of a plurality of portions of the reserved quantity of storage;
attempting to lock the current portion of the reserved quantity of storage;
allocating for storage of data, in response to a lock granted to the current portion, an amount of storage from the current portion;

selecting, in response to denial of the lock of the current portion, a new portion that sequentially follows the current portion, and repeating the steps of attempting, allocating, and selecting using the new portion as the current portion.

5. The method of claim 4, further comprising queuing for a lock on the portion of the reserved quantity of storage selected at random in response to denial of locks for each other portion of the reserved quantity of storage.

6. The method of claim 1, further comprising:
wherein the second one of the allocation approaches includes,
selecting a portion of the reserved quantity of storage in response to specification of the portion in an allocation request;
attempting to lock the portion of the reserved quantity of storage;
allocating for storage of data, in response to a lock granted to the portion, an amount of storage from the portion;
queuing for a lock on the portion of the reserved quantity of storage in response to a denial of a lock for the portion of storage.

7. The method of claim 1, further comprising:
associating, in response to de-allocation of a quantity of storage from storage of file data, the de-allocated quantity of storage with one of the allocation records;
for each portion of storage associated with an allocation record, identifying as previously used storage each de-allocated quantity of storage, and identifying as never-used storage each quantity of storage that has not been selected for allocation to the file;
wherein selecting a portion of storage for storage of data, includes selecting a quantity first from previously used storage in an allocation record, and in response to no previously used storage being associated with the allocation record, selecting a quantity from never-used storage of the allocation record.

8. The method of claim 7, further comprising locking an allocation record for exclusive access prior to performing the selecting using the first allocation approach and the selecting using the second allocation approach.

9. The method of claim 8, further comprising:
wherein the allocation records are ordered first to last, and the respective portions of storage associated with the allocation records are sequential ranges of storage addresses, with a range having a beginning address of the reserved storage being associated with the first allocation record and each successively addressed range being associated with a successive one of the allocation records;
wherein the first one of the allocation approaches includes,
selecting the first allocation record as a current allocation record;
attempting to lock the current allocation record;
allocating for storage of data, in response to a lock granted to the current allocation record, an amount of storage from the current allocation record;
selecting, in response to denial of the lock of the current allocation record, a succeeding allocation record of the current allocation record, and repeating the steps of attempting, allocating, and selecting using the succeeding allocation record as the current allocation record.

10. The method of claim 9, further comprising queuing for a lock on the first allocation record in response to denial of locks for each other allocation record.

11. The method of claim 8, further comprising:
wherein the allocation records are ordered first to last, and the respective portions of storage associated with the allocation records are sequential ranges of storage addresses, with a range having a beginning address of the reserved storage being associated with the first allocation record and each successively addressed range being associated with a successive one of the allocation records;
wherein the second one of the allocation approaches includes,
selecting at random an initial one of the plurality of allocation records as a current allocation record;
attempting to lock the current allocation record;
allocating for storage of data, in response to a lock granted to the current allocation record, an amount of storage associated with the current allocation record;
selecting, in response to denial of the lock of the current allocation record, a succeeding allocation record of the current allocation record, and repeating the steps of attempting, allocating, and selecting using the succeeding allocation record as the current allocation record.

12. The method of claim 11, further comprising queuing for a lock on the initial one of the allocation records in response to denial of locks for each other allocation record.

13. The method of claim 8, further comprising:
wherein the allocation records are ordered first to last, and the respective portions of storage associated with the allocation records are sequential ranges of storage addresses, with a range having a beginning address of the reserved storage being associated with the first allocation record and each successively addressed range being associated with a successive one of the allocation records;
wherein the second one of the allocation approaches includes,
selecting an allocation record in response to specification of the allocation record in an allocation request;
attempting to lock the allocation record;
allocating for storage of data, in response to a lock granted to the allocation record, an amount of storage associated with the allocation record;
queuing for a lock on the allocation record in response to a denial of a lock for the allocation record.

14. An apparatus for allocating storage for a file, comprising:
means for reserving a quantity of sequential physical storage for the file;
means for selecting, in response to each call to allocate an available portion of the storage of the file, one of a plurality of allocation approaches based on a value of a file attribute associated with the file;
means for establishing a plurality of allocation records for the file and for assigning initial respective portions of the reserved quantity of storage with the allocation records, wherein for the value of the file attribute specifying a first of the allocation approaches, the initial respective portions increase in quantity from a first of the allocation records to a last of the allocation records, and for the value of the file attribute specifying a second of the allocation approaches, the initial respective portions have equal quantities;
means for selecting for storage of data, responsive to selection of the first allocation approach, a portion of storage of the file from one of the respective portions assigned to one of the allocation records, wherein the selecting under the first approach begins with the first allocation record and proceeds toward the last allocation record in seeking an available portion to allocate wherein physical storage is allocated based on maintaining sequentially allocated portions;

means for selecting for storage of data, responsive to selection of the second allocation approach, a portion of storage of the file from one of the respective portions assigned to one of the allocation records, wherein the selecting under the second approach begins with an allocation record other than the first allocation record in seeking an available portion to allocate wherein physical storage is allocated based on maintaining concurrent access to the file and means, responsive to an allocation record having no available portion of storage for the file, for reassigning portions from one allocation record to another, wherein reassigning for the file attribute indicating the first approach reassigns portions from a next successive allocation record, and reassigning for the file attribute indicating the second approach balances respective portions assigned to the allocation records.

15. A system for allocating storage for a database file, comprising:

a data processing system;

a quantity of retentive storage reserved for allocation to a database file and coupled to the data processing system, wherein the quantity occupies sequential physical locations;

a file attribute associated with the database file, wherein the value of the file attribute indicates one of a plurality of allocation approaches for allocating storage from the reserved storage to the file;

a plurality of allocation records associated with respective portions of the reserved quantity of storage, wherein initially respective portions of the reserved quantity of storage are assigned to the allocation records, for the value of the file attribute specifying a first of the allocation approaches, the initial respective portions increase in quantity from a first of the allocation records to a last of the allocation records, and for the value of the file attribute specifying a second of the allocation approaches, the initial respective portions have equal quantities; and a database management system (DBMS) hosted by the data processing system and coupled to the quantity of retentive storage and to the allocation records, the DBMS configured to:

select, in response to each call to allocate an available portion of reserved storage, one of the plurality of allocation approaches based on the a value of the file attribute, select for storage of data, in response to selection of the first allocation approach, a portion of reserved storage of the file from one of the respective portions assigned to one of the allocation records, wherein the selecting under the first approach begins with the first allocation record and proceeds toward the last allocation record in seeking an available portion to allocate and is based on attempting to store the data in sequential physical storage, and select for storage of data, in response to selection of the second allocation approach, a portion of reserved storage of the file from one of the respective portions assigned to one of the allocation records, wherein the selecting under the second approach begins with an allocation record other than the first allocation record in seeking an available portion to allocate and is based on attempting to maintain concurrent access to the database file reassign, in response to an allocation record having no available portion of storage for the file, portions from one allocation record to another, wherein reassigning for the file attribute indicating the first approach reassigns portions from a next successive allocation record, and reassigning for the file attribute indicating the second approach balances respective portions assigned to the allocation records.

\* \* \* \* \*